United States Patent
Cho et al.

(10) Patent No.: US 9,928,219 B2
(45) Date of Patent: Mar. 27, 2018

(54) APPARATUS AND METHOD FOR CASE CONVERSION

(71) Applicant: Samsung Electronics Co., Ltd, Gyeonggi-do (KR)

(72) Inventors: Jae-Wan Cho, Gyeonggi-do (KR); Myung-Su Kang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 406 days.

(21) Appl. No.: 14/019,283

(22) Filed: Sep. 5, 2013

(65) Prior Publication Data
US 2014/0281949 A1    Sep. 18, 2014

(30) Foreign Application Priority Data
Mar. 13, 2013    (KR) .................. 10-2013-0026815

(51) Int. Cl.
*G06F 17/21*    (2006.01)
*G06F 17/22*    (2006.01)
*G06F 3/023*    (2006.01)

(52) U.S. Cl.
CPC ............ *G06F 17/214* (2013.01); *G06F 3/023* (2013.01); *G06F 17/2217* (2013.01)

(58) Field of Classification Search
None
See application file for complete search history.

(56) References Cited

U.S. PATENT DOCUMENTS

| 4,290,105 A * | 9/1981 | Cichelli | G06F 17/273 |
| 5,347,295 A * | 9/1994 | Agulnick | G06F 1/1626 |
| | | | 345/156 |
| 5,778,402 A * | 7/1998 | Gipson | G06F 17/21 |
| | | | 715/201 |
| 5,787,197 A * | 7/1998 | Beigi | G06K 9/723 |
| | | | 382/187 |
| 6,360,237 B1* | 3/2002 | Schulz | G10L 15/22 |
| | | | 704/231 |
| 2004/0168131 A1* | 8/2004 | Blumberg | G06F 3/0237 |
| | | | 715/261 |

(Continued)

FOREIGN PATENT DOCUMENTS

| CN | 101408807 A | 4/2009 |
| CN | 102422621 A | 4/2012 |

(Continued)

OTHER PUBLICATIONS

State Intellectual Property Office of P.R. China First Office Action, dated Sep. 22, 2017, regarding Chinese Patent Application No. 201310460170.2, 36 pages.

(Continued)

*Primary Examiner* — David H Chu

(57) ABSTRACT

An apparatus and a method of changing a character in a terminal, capable of conveniently changing a capital letter and a small letter of an input word, includes a controller that, whenever a change key is entered after a specific word is selected in an input mode, is configured to sequentially perform a change in a first character among characters of the specific word to a capital letter or a small letter, a change in entire characters of the specific word to capital letters, and a change of the entire characters of the specific word to small letters.

16 Claims, 11 Drawing Sheets

(56) References Cited

U.S. PATENT DOCUMENTS

| | | |
|---|---|---|
| 2010/0289747 A1 | 11/2010 | Lee et al. |
| 2012/0188168 A1 | 7/2012 | Yoon |
| 2013/0311948 A1* | 11/2013 | McCoy .................. G06F 3/048 715/825 |

FOREIGN PATENT DOCUMENTS

| | | |
|---|---|---|
| CN | 102474539 A | 5/2012 |
| CN | 102945113 A | 2/2013 |
| EP | 2317417 A1 | 5/2011 |
| KR | 20-2008-0004200 U | 9/2008 |
| KR | 10-2012-0124835 | 11/2014 |

OTHER PUBLICATIONS

Extended European Search Report, dated Nov. 28, 2017, regarding European Patent Application No. 13184847.5, 9 pages.
Kumar, "Change Case—MS Word 2010 Tutorial", A1 MS Word Tutorials, Feb. 17, 2013, 2 pages. http://www.1wordtut.com/2013/02/change-case-ms-word-tutorial.html.

* cited by examiner

APPARATUS AND METHOD FOR CASE CONVERSION

CROSS-REFERENCE TO RELATED APPLICATION(S) AND CLAIM OF PRIORITY

The present application is related to and claims the priority under 35 U.S.C. § 119(a) to Korean Application Serial No. 10-2013-0026815, which was filed in the Korean Intellectual Property Office on Mar. 13, 2013, the entire content of which is hereby incorporated by reference.

TECHNICAL FIELD

The present disclosure relates generally to an apparatus and a method of changing a character in a terminal, and more particularly, to an apparatus and a method of changing a character in a terminal, capable of conveniently changing a capital letter and a small letter of an input word.

BACKGROUND

In a case where an alphabetic letter is entered in a general input mode, an alphabetic letter is entered while shifting the input mode to a capital letter input mode or a small letter input mode through an input of a Caps Lock key.

Especially, in a case where a character input as a small letter among alphabetic letters of an already input word is desired to be changed to a capital letter or a character input as a capital letter is desired to be changed to a small letter, it is inconveniently necessary to select and delete a corresponding character, switch the input mode to a capital input mode or a small letter input mode by inputting a Caps Lock key, and then input a letter again.

SUMMARY

To address the above-discussed deficiencies of the prior art, it is a primary object to provide an apparatus and a method of changing a character in a terminal capable of conveniently changing a capital letter and a small letter of an input word.

In accordance with an aspect of the present disclosure, an apparatus for changing a character in a terminal is provided. The apparatus includes a controller that, whenever a change key is entered after a specific word is selected from words input in an input mode, is configured to sequentially perform a change in a first character among characters of the specific word to a capital letter or a small letter, a change in entire characters of the specific word to capital letters, and a change of the entire characters of the specific word to small letters.

In accordance with another aspect of the present disclosure, a method of changing a character in a terminal is provided. The method includes: when. a specific word in an input mode is selected and then a change key is entered, changing the first character among characters of the specific word to a capital letter or a small letter; when the change key is entered in a state where the first character of the specific word is changed, changing entire characters of the specific word to capital letters; and when the change key is entered during a display of the entire characters of the specific word with the capital letters, changing the entire characters of the specific word to small letters.

Accordingly, the apparatus and the method of changing a character in the terminal has an effect of conveniently changing a capital letter and a small letter of an input word.

Before undertaking the DETAILED DESCRIPTION OF THE DISCLOSURE below, it can be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
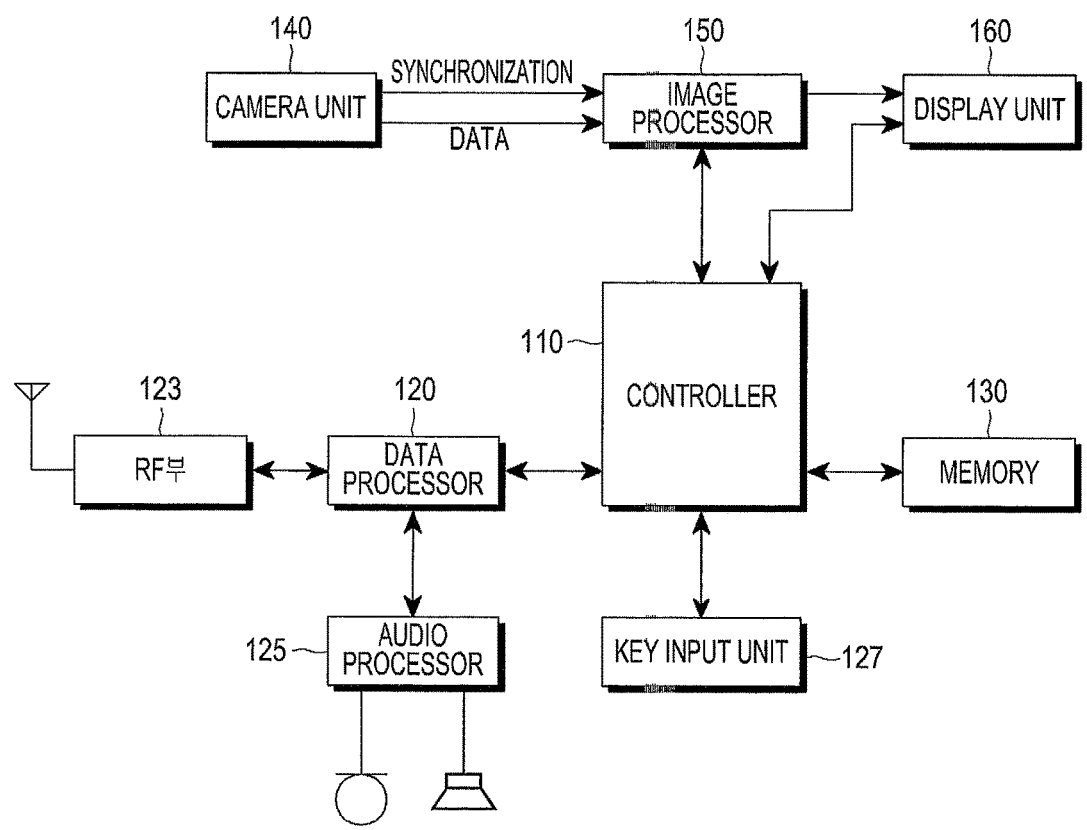
FIG. 1 is a diagram of a terminal according to an embodiment of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices.

Hereinafter, various embodiments of the present disclosure will be described with reference to the accompanying drawings. In the following description, a detailed description of known functions and configurations incorporated herein will be omitted when it may make the subject matter of the present disclosure rather unclear. Further, various specific definitions found in the following description are provided only to help general understanding of the present disclosure, and it is apparent to those skilled in the art that the present disclosure can be implemented without such definitions. Therefore, the definitions thereof should be made based on the contents reflecting the entire description of the present specification.

Hereinafter, exemplary embodiments of the present disclosure will be described in detail with reference to the accompanying drawings. In the following description, the same elements will be designated by the same reference numerals although they are shown in different drawings.

A terminal according to embodiments of the present disclosure includes a portable terminal and a fixed terminal. Here, the portable terminal is a easily portable and mobile terminal, and may include a video phone, a portable phone, a smart phone, an International Mobile Telecommunication (IMT) 2000 terminal, a Wideband Code Division Multiple Access (WCDMA) terminal, a Universal Mobile Telecommunication Service (UMTS) terminal, Personal Digital Assistants (PDAs), a Portable Multimedia Player (PMP), a Digital Multimedia Broadcasting (DMB) terminal, an E-book reader, a portable computer (a notebook computer and a tablet computer), or a digital camera. Further, the fixed terminal may include a desktop personal computer and the like.

FIG. 1 is a diagram illustrating a configuration of a terminal according to an embodiment of the present disclosure.

Referring to FIG. 1, an RF unit 123 performs a wireless communication function of a portable terminal. The RF unit 123 includes an RF transmitter for up-converting and amplifying a frequency of a transmitted signal and an RF receiver for low-noise amplifying a received signal and down-converting a frequency. A data processor 120 includes a transmitter for encoding and modulating the transmitted signal and a receiver for demodulating and decoding the received signal. That is, the data processor 120 can be formed of a modem and a codec. Here, the codec includes a data codec for processing packet data, etc. and an audio codec for processing an audio signal, such as voice. An audio processor 125 performs a function of reproducing a received audio signal output from the audio codec of the data processor 120 or transmitting a transmitted audio signal generated in a microphone to the audio codec of the data processor 120.

A key input unit 127 includes keys for inputting number and character information and functional keys for setting various functions.

Further, the key input unit 127 can include a change key capable of sequentially performing a change in the first character of an input specific word, a change in a capital letter of the specific word, and a change in a small letter of the specific word, and the change key can be a Caps Lock key.

A memory 130 can be formed of a program memory and a data memory. The program memory can store programs for controlling a general operation of the terminal, and programs for controlling so as to sequentially perform a first character change of a selected specific word, a capital letter change for the entire characters of the specific word, and a small letter change for the entire characters of the specific word whenever the change key is entered. Further, the data memory serves to temporarily store data generated during the performance of the programs.

A controller 110 performs the general operations of the portable terminal.

According to the embodiment of the present disclosure, the controller 110 performs a control so as to sequentially perform a change of a first character among characters of a specific word to a capital letter or a small letter, a capital letter change for the entire characters of the specific word, and a small letter change for the entire characters of the specific word whenever the specific word in the input mode is selected and then a change key is entered.

Further, according to a first embodiment of the present disclosure, when a specific word in the input mode is selected and then the change key is entered, and a first character among characters of the specific word is a small letter, the controller 110 changes the first character to a capital letter. Further, when the change key is entered in a state where the first character of the specific word is displayed as a capital letter, the controller 110 changes the entire characters of the specific word to capital letters, and when the change key is entered in a state where the entire characters of the specific word are displayed as the capital letters, the controller 110 changes the entire characters of the specific word to small letters. When the change key is entered in a state where the entire characters of the specific word are displayed as the small letters, the controller 110 performs a control so as to change only the first character of the specific word to the capital letter.

Further, when the change key is entered in a state where the first character of the specific word are displayed as the capital letters, and a small letter is not present in the specific word, the controller 110 performs a control so as to change the entire characters of the specific word to the small letters.

Further, according to a second embodiment of the present disclosure, when a specific word in the input mode is selected and then the change key is entered, and a first character among characters of the specific word is a small letter, the controller 110 changes the first character to a capital letter. When the change key is entered in a state where the first character of the specific word is displayed as the capital letter, the controller 110 compares the number of capital letters of the specific word and the number of small letters of the specific word. As a result of the comparison, when the number of capital letters of the specific word is greater than the number of small letters of the specific word, the controller 110 is configured to change the entire characters of the word to capital letters, and when the number of capital letters of the specific word is less than the number of small letters of the specific word, the controller 110 is configured to change the entire characters of the word to small letters.

Further, according to a third embodiment of the present disclosure, when a specific word in the input mode is selected and then the change key is entered, and a first character among characters of the specific word is a capital letter, the controller 110 is configured to change the first letter to a small letter. Further, when the change key is entered in a state where the first character of the specific word is displayed as a small letter, the controller 110 changes the entire characters of the specific word to capital letters, and when the change key is entered in a state where the entire characters of the specific word are displayed as the capital letters, the controller 110 is configured to change the entire characters of the specific word to small letters. When the change key is entered in a state where the entire characters of the specific word are displayed as the small letters, the controller 110 is configured to change only the first character of the specific word to the capital letter.

Further, according to a fourth embodiment of the present disclosure, when a specific word in the input mode is selected and then the change key is entered, and a first character among characters of the specific word is a capital letter, the controller 110 is configured to change the first letter to a small letter. Further, when the change key is entered in a state where the first character of the specific word is displayed as the capital letter, the controller 110 compares the number of capital letters of the specific word and the number of small letters of the specific word. As a result of the comparison, when the number of capital letters of the specific word is greater than the number of small letters of the specific word, the controller 110 is configured to change the entire characters of the word to capital letters, and when the number of capital letters of the specific word is less than the number of small letters of the specific word, the controller 110 is configured to change the entire characters of the word to small letters.

Further, according to a fifth embodiment of the present disclosure, when partial characters among characters of a specific word in the input mode are selected and then the change key is entered, and a first character among the partial characters is a small letter, the controller 110 is configured to change the first character to a capital letter. Further, when the change key is entered in a state where the first character among the partial characters is displayed as the capital letter, the controller 110 is configured to change all of the partial characters to capital letters, and when the change key is entered in a state where all of the partial characters are displayed as the capital letters, the controller 110 is configured to change all of the partial characters to small letters. Further, when the change key is entered in a state where the first character among the partial characters is displayed as the capital letter, and a small letter is not present in the partial characters, the controller 110 is configured to change all of the partial characters to the small letters.

Further, according to a sixth embodiment of the present disclosure, when partial characters among characters of a specific word in the input mode are selected and then the change key is entered, and a first character among the partial characters is a capital letter, the controller 110 is configured to change the first character to a small letter. Further, when the change key is entered in a state where the first character among the partial characters is displayed as the small letter, the controller 110 is configured to change all of the partial characters to capital letters, and when the change key is entered in a state where all of the partial characters are displayed as the capital letters, the controller 110 is configured to change all of the partial characters to small letters.

Further, according to a seventh embodiment of the present disclosure, when partial characters including the first character among characters of a specific word in the input mode are selected and then the change key is entered, and a first character among the specific word is a capital letter, the controller 110 is configured to change the remaining characters, except for the first character, among the partial characters, to small letters. Further, when the change key is entered in a state where only the first character among the partial characters is displayed as the capital letter, the controller 110 is configured to change the entire characters of the specific word to the small letters. Further, when the change key is entered in a state where the entire characters of the specific word are displayed as the small letters, the controller 110 can make a control so as to change the entire characters of the specific word to the small letters.

A camera unit 140 photographs image data, and includes a camera sensor for converting a photographed optical signal to an electric signal and a signal processor for converting an analog image signal photographed by the camera sensor to digital data. Here, it is assumed that the camera sensor is a CCD sensor or a CMOS sensor, and the signal processor can be implemented as a Digital Signal Processor (DSP). Further, the camera sensor can be integrally or separately formed with the signal processor.

An image processor 150 performs Image Signal Processing (ISP) for displaying an image signal output from the camera unit 140 on the display unit 160, and the ISP performs a function, such as gamma correction, interpolation, a spatial change, an image effect, an image scale, Auto White Balance (AWB), Auto Exposure (AE), and Auto Focus (AF). Therefore, the image processor 150 processes an image signal output from the camera unit 140 frame by frame, and outputs the frame image data in accordance with a characteristic and a size of the display unit 160. Further, the image processor 150 includes an image codec, and compresses frame image data displayed on the display unit 160 by a preset scheme or restores the compressed frame image data to original frame image data. Here, the image codec can include a JPEG codec, an MPEG4 codec, a Wavelet codec, etc. It is assumed that the image processor 150 has an On Screen Display (OSD) function and can output OSD data in accordance with a screen size displayed under the control of the controller 110.

The display unit 160 displays an image signal output from the image processor 150 on a screen and displays user data output from the controller 110. Here, the display unit 160 can use an LCD, and in this case, the display unit 160 can include an LCD controller, a memory capable of storing image data, and an LCD display device. Here, when the LCD is implemented by a touch screen scheme, the LCD can serve as an input unit, and in this case, the display unit 160 can display keys, such as the key input unit 127.

Further, in a case where the display unit 160 is used as a touch screen unit according to the implementation of the display unit 160 by the touch screen scheme, the touch screen unit is formed of a Touch Screen Panel (TSP) including a plurality of sensor panels, and the plurality of sensor panels can include an electrostatic sensor panel capable of recognizing a touch of a hand, and an electromagnetic inducing sensor panel capable of sensing a minute touch, such as a touch pen.

An operation of changing a capital letter/small letter for an alphabetic letter in the terminal will be described in detail with reference to FIGS. 2 to 6. Hereinafter, a Caps Lock key will be described as an example of a change key in the embodiments of the present disclosure, but any key having the purpose of changing a capital letter and a small letter for an input word, as well as the Caps Lock key, can be equally applied.

Figure 2A:
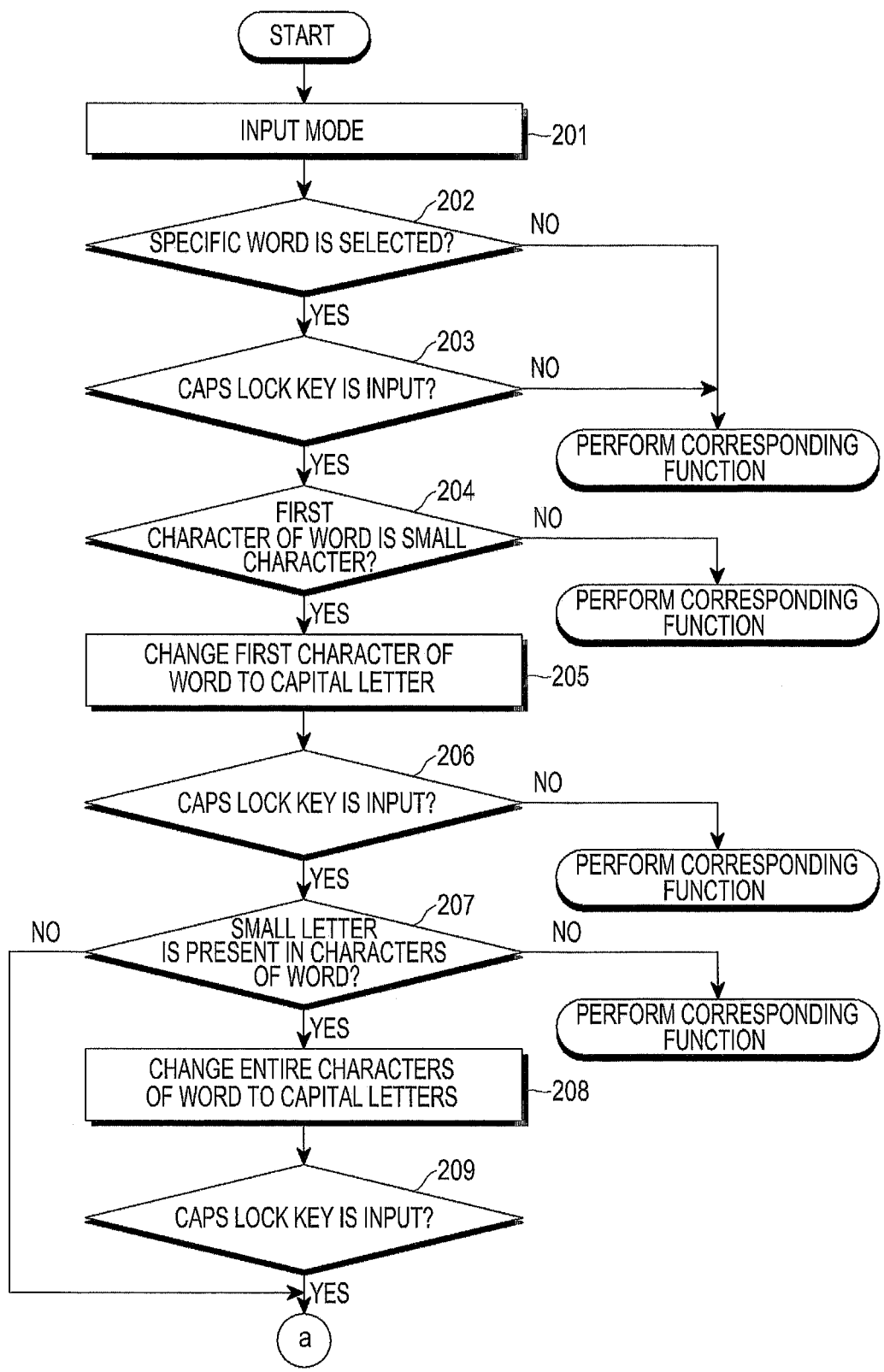
FIGS. 2A and 2B are flowcharts illustrating a process of changing a character in a terminal according to a first embodiment of the present disclosure.
Figure 2B:
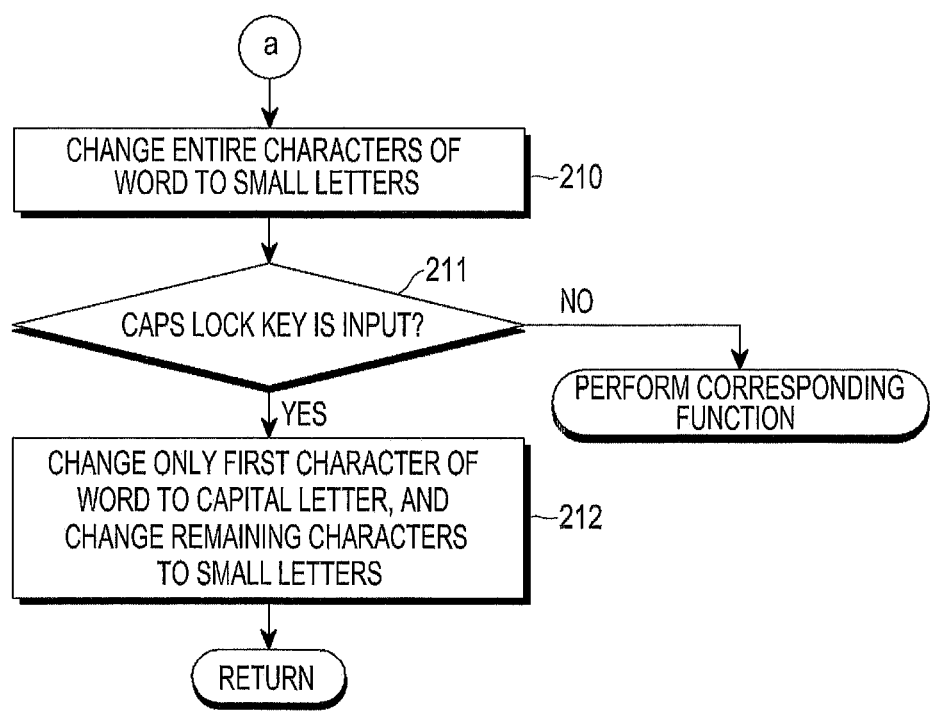

FIGS. 2A and 2B are flowcharts illustrating a process of changing a character in the terminal according to the first embodiment of the present disclosure.

Hereinafter, the embodiment of the present disclosure will be described in more detail with reference to FIGS. 2A and 2B together with FIG. 1.

Referring to FIGS. 2A and 2B, when a specific word is selected from input words during performance of an input operation for the words in step 201 which is an input mode, the controller 110 detects the selection of the specific word in step 202. The selection of the specific word can be determined when a specific word is high-lighted through an operation, such as a drag, when a cursor is positioned at or behind the last character of the specific word, or when a cursor is positioned at or before the first character of the specific word.

When the Caps Lock key is entered after the specific word is selected, the controller 110 detects the input of the capital lock key in step 203, and determines whether the first character among characters included in the specific word is a small letter. When the first character of the specific word is the small letter, the controller 110 detects that the first character of the specific word is the small letter in step 204, and changes only the first character of the specific word to a capital letter in step 205.

When the Caps Lock key is entered again during a display of the specific word of which the first character is changed to the capital letter, the controller 110 detects the input of the Caps Lock key in step 206, and determines whether a small letter is present in the specific word of which the first character is changed to the capital letter.

When the small letter is present in the specific word of which the first character is changed to the capital letter, the controller 110 detects that the small letter is present in the specific word of which the first character is changed to the capital letter in step 207, and changes the entire characters of the specific word to capital letters in step 208.

When the Caps Lock key is entered again during a display of the entire characters of the specific word with the capital letters, the controller 110 detects the input of the Caps Lock key in step 209, and changes the entire characters of the specific word to the small letters and displays the specific word in step 210.

Further, when the Caps Lock key is entered again during a display of the entire characters of the specific word as the small letters, the controller 110 detects the input of the Caps Lock key in step 211, and changes the first character of the specific word to the capital letter and changes the remaining characters to small letters to display the specific word in step 212. For example, when "patent" is selected from words in the input mode and then the Caps Lock key is entered, "patent" can be changed to "Patent", and when the Caps Lock key is entered again, "Patent" can be changed to "PATENT", and when the Caps Lock key is entered again, "PATENT" can be changed to "patent".

Otherwise, when "pATEnt" is selected from words in the input mode and then the Caps Lock key is entered, "pATEnt" can be changed to "PATEnt", when the Caps Lock key is entered again, "PATEnt" can be changed to "PATENT", when the Caps Lock key is entered again, "PATENT" can be changed to "patent", and when the Caps Lock key is entered again, "patent" can be changed to "Patent".

Otherwise, when "pATENT" is selected from words in the input mode and then the Caps Lock key is entered, "pATENT" can be changed to "PATENT", when the Caps Lock key is entered again, "PATENT" can be changed to "patent", and when the Caps Lock key is entered again, "patent" can be changed to "Patent".

Figure 3A:
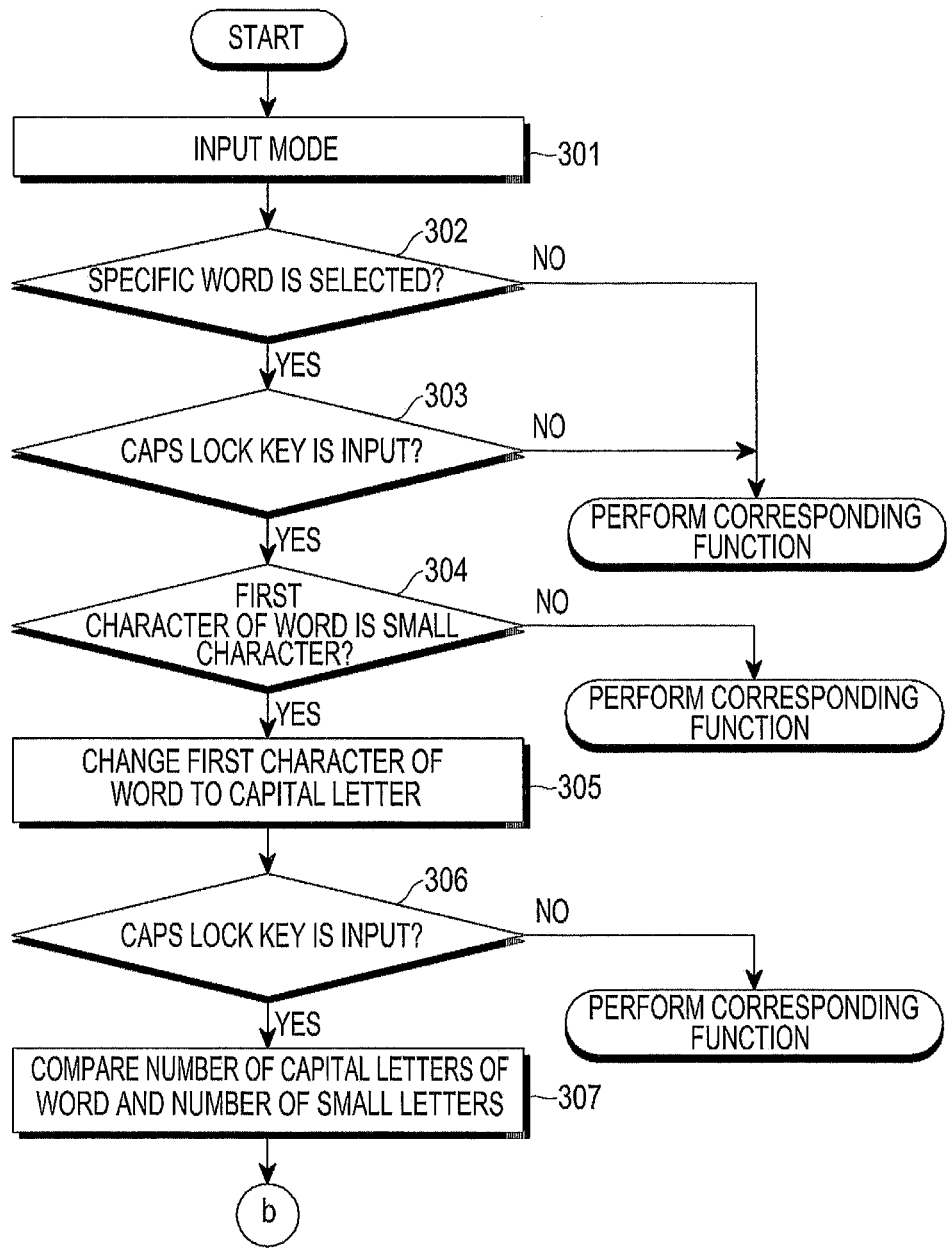
FIGS. 3A and 3B are flowcharts illustrating a process of changing a character in a terminal according to a second embodiment of the present disclosure.
Figure 3B:
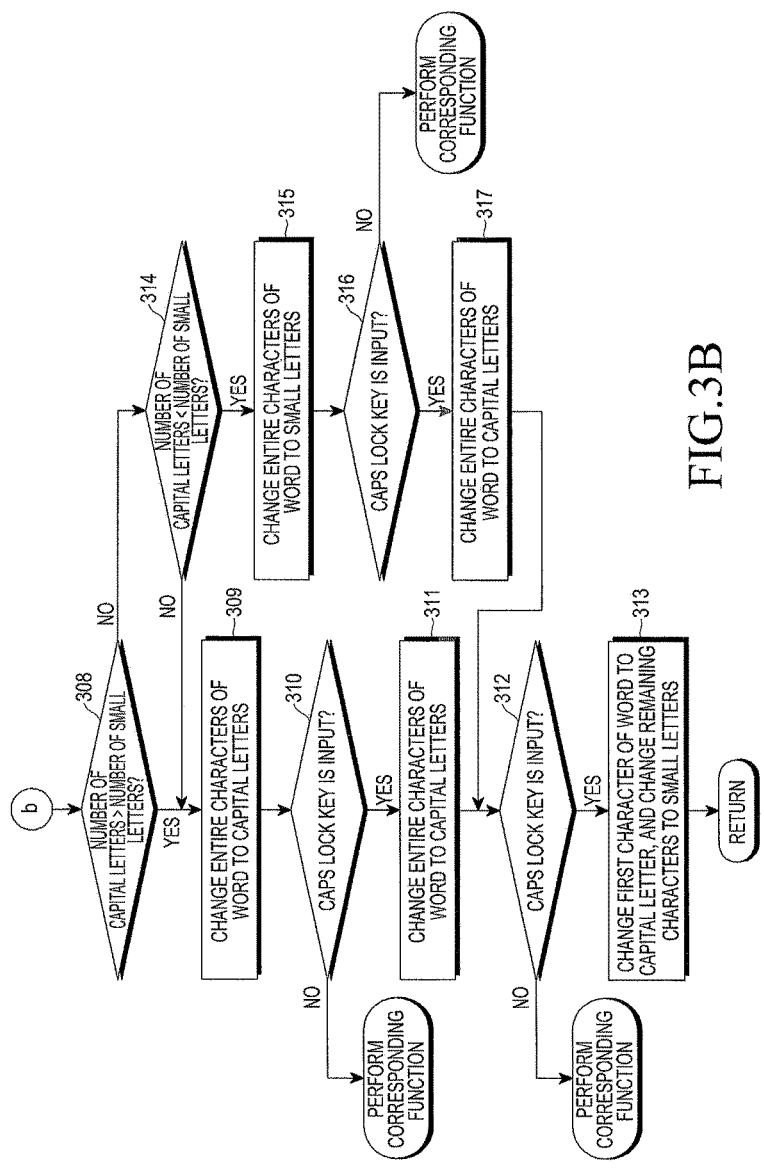

FIGS. 3A and 3B are flowcharts illustrating a process of changing a character in the terminal according to the second embodiment of the present disclosure.

Hereinafter, the embodiment of the present disclosure will be described in more detail with reference to FIGS. 3A and 3B together with FIG. 1.

Referring to FIGS. 3A and 3B, when a specific word is selected from input words during performance of an input operation for the words in step 301 which is an input mode, the controller 110 detects the selection of the specific word in step 302. The selection of the specific word can be determined when a specific word is high-lighted through an operation, such as a drag, when a cursor is positioned at or behind the last character of the specific word, or when a cursor is positioned at or before the first character of the specific word.

When the Caps Lock key is entered after the specific word is selected, the controller 110 detects the input of the capital lock key in step 303, and determines whether the first character among characters included in the specific word is a small letter. When the first character of the specific word is the small letter, the controller 110 detects that the first character of the specific word is the small letter in step 304, and changes only the first character of the specific word to a capital letter in step 305.

When the Caps Lock key is entered again during a display of the specific word of which the first character is changed to the capital letter, the controller 110 detects the input of the Caps Lock key in step 306, and compares the number of capital letters included in the specific word and the number of small letters in step 307.

As a result of the comparison, when the number of capital letters is greater than the number of small letters, the controller 110 detects that the number of capital letters is greater than the number of small letters in step 308, and changes the entire characters of the specific word to the capital letters in step 309.

Further, when the Caps Lock key is entered again during a display of the specific word of which the entire characters are changed to the capital letters, the controller 110 detects the input of the Caps Lock key in step 310, and changes the entire characters of the specific word to the small letters and displays the specific word with the small letters in step 311.

When the Caps Lock key is entered again during a display of the specific word of which the entire characters are changed to the small letters, the controller 110 detects the input of the Caps Lock key in step 312, and changes the first character of the specific word to the capital letter and the remaining characters to the small letters to display the specific word in step 313.

Otherwise, as a result of the comparison, when the number of capital letters is less than the number of small letters, the controller 110 detects that the number of capital letters is less than the number of small letters in step 314, and changes the entire characters of the specific word to the small letters in step 315.

Further, when the Caps Lock key is entered again during a display of the specific word of which the entire characters are changed to the small letters, the controller 110 detects the input of the Caps Lock key in step 316, and changes the entire characters of the specific word to the capital letters and displays the specific word in step 317.

When the Caps Lock key is entered again during a display of the specific word of which the entire characters are changed to the capital letters, the controller 110 detects the input of the Caps Lock key in step 312, and changes the first character of the specific word to the capital letter and the remaining characters to the small letters to display the specific word in step 313.

Further, as a result of the comparison, when the number of capital letters is equal to the number of small letters, the controller 110 detects that the number of capital letters is equal to the number of small letters in step 314, and changes the entire characters of the specific word to the capital letters in step 309.

For example, when "patent" is selected from words in the input mode and then the Caps Lock key is entered, "patent" can be changed to "Patent", and when the Caps Lock key is entered again, "Patent" can be changed to "patent" because the number of small letters is greater than the number of capital letters in changed "Patent", when the Caps Lock key is entered again, "patent" can be changed to "PATENT", and when the Caps Lock key is entered again, "PATENT" can be changed to "Patent".

Otherwise, when "pATEnt" is selected from words input in the input mode and then the Caps Lock key is entered, "pATEnt" can be changed to "PATEnt", when the Caps Lock key is entered again, "PATEnt" can be changed to "PATENT" because the number of capital letters is greater than the number of small letters in the changed word "PATEnt", when the Caps Lock key is entered again, "PATENT" can be changed to "patent", and when the Caps Lock key is entered again, "patent" can be changed to "Patent".

Otherwise, when "pATENT" is selected from words input in the input mode and then the Caps Lock key is entered, "pATENT" can be changed to "PATENT", when the Caps Lock key is entered again, "PATENT" can be changed to "patent" without comparison because the changed word "PATENT" consists of only the capital letters, and when the Caps Lock key is entered again, "patent" can be changed to "Patent".

Figure 4:
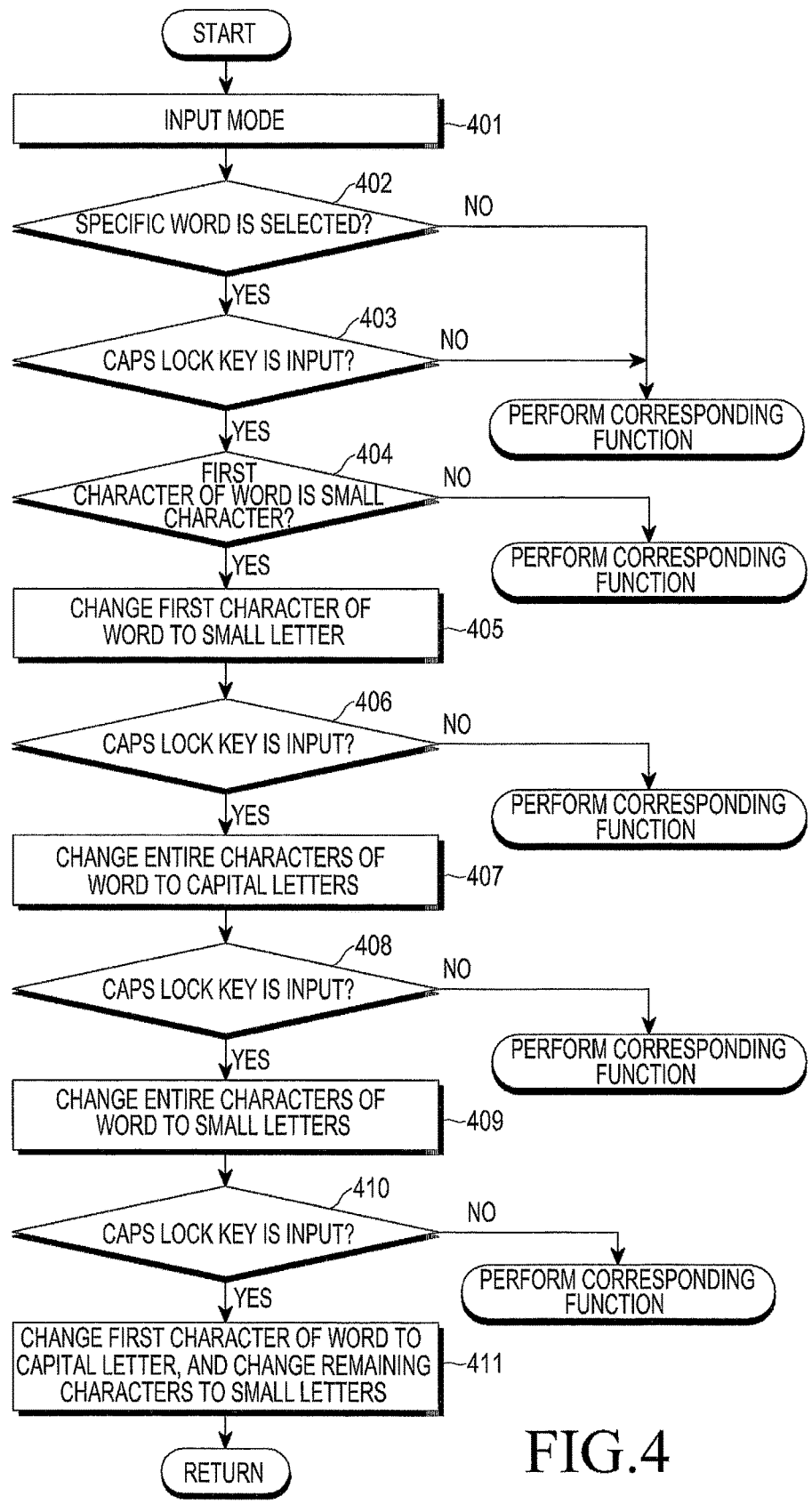
FIG. 4 is a flowchart illustrating a process of changing a character in a terminal according to a third embodiment of the present disclosure.

FIG. 4 is a flowchart illustrating a process of changing a character in the terminal according to a third embodiment of the present disclosure.

Hereinafter, the embodiment of the present disclosure will be described in more detail with reference to FIG. 4 together with FIG. 1.

Referring to FIG. 4, when a specific word is selected from input words during performance of an input operation for the words in step 401 which is an input mode, the controller 110 detects the selection of the specific word in step 402. The selection of the specific word can be determined when a specific word is high-lighted through an operation, such as a drag, when a cursor is positioned at or behind the last character of the specific word, or when a cursor is positioned at or before the first character of the specific word.

When the Caps Lock key is entered after the specific word is selected, the controller 110 detects the input of the capital lock key in step 403, and determines whether the first character among characters included in the specific word is a capital letter. When the first character of the specific word is the capital letter, the controller 110 detects that the first character of the specific word is the capital letter in step 404, and changes only the first character of the specific word to a small letter in step 405.

When the Caps Lock key is entered again during a display of the specific word of which the first character is changed to the small letter, the controller 110 detects the input of the Caps Lock key in step 406, and changes the entire characters of the specific word to capital letters in step 407.

When the Caps Lock key is entered again during a display of the entire characters of the specific word with the capital letters, the controller 110 detects the input of the Caps Lock key in step 408, and changes the entire characters of the specific word to the small letters and displays the specific word with the small letters in step 409.

Further, when the Caps Lock key is entered again during a display of the entire characters of the specific word with the small letters, the controller 110 detects the input of the Caps Lock key in step 410, and changes the first character of the specific word to the capital letter and changes the remaining characters to small letters to display the specific word in step 411.

For example, when "Patent" is selected from words input in the input mode and then the Caps Lock key is entered, "Patent" can be changed to "patent", and when the Caps Lock key is entered again, "patent" can be changed to "PATENT", when the Caps Lock key is entered again, "PATENT" can be changed to "patent", and when the Caps Lock key is entered again, "patent" can be changed to "Patent".

Otherwise, when "PateNT" is selected from words input in the input mode and then the Caps Lock key is entered, "PateNT" can be changed to "pateNT", when the Caps Lock key is entered again, "pateNT" can be changed to "PATENT", when the Caps Lock key is entered again, "PATENT" can be changed to "patent", and when the Caps Lock key is entered again, "patent" can be changed to "Patent".

Otherwise, when "PATENT" is selected from words input in the input mode and then the Caps Lock key is entered, "PATENT" can be changed to "pATENT", when the Caps Lock key is entered again, "pATENT" can be changed to "patent", and when the Caps Lock key is entered again, "patent" can be changed to "Patent".

Figure 5A:
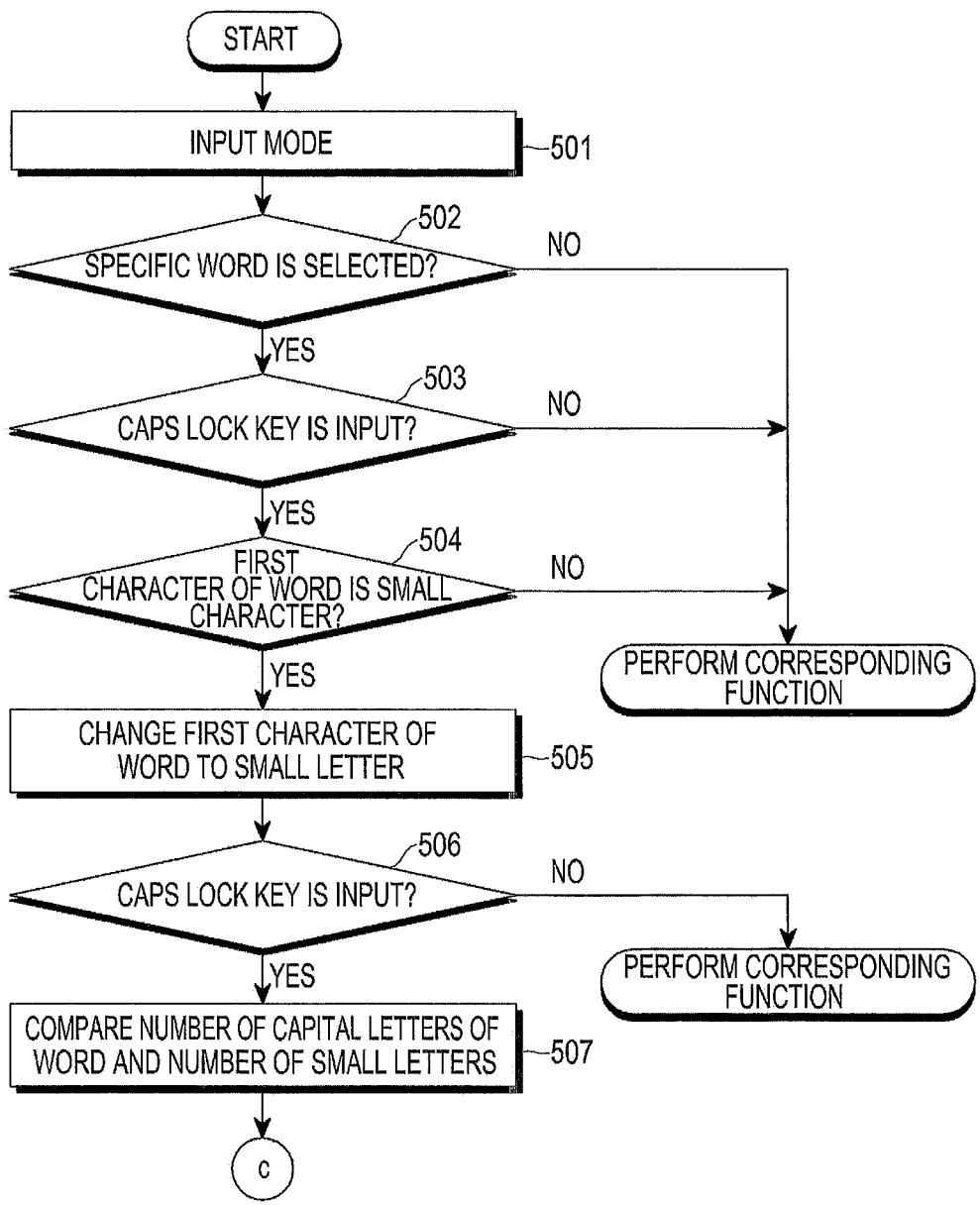
FIGS. 5A and 5B are flowcharts illustrating a process of changing a character in a terminal according to a fourth embodiment of the present disclosure.
Figure 5B:
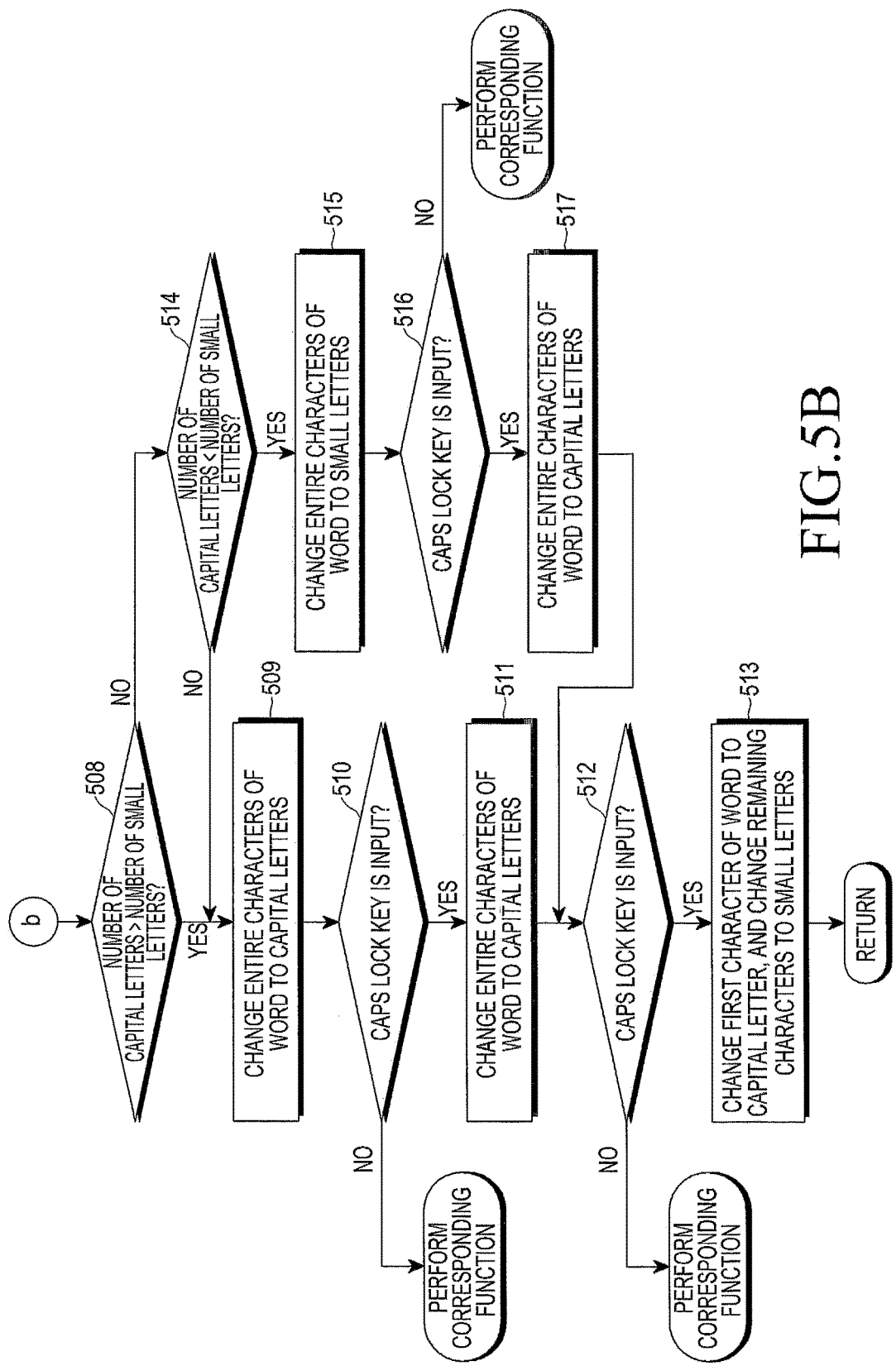

FIGS. 5A and 5B are flowcharts illustrating a process of changing a character in the terminal according to the fourth embodiment of the present disclosure.

Hereinafter, the embodiment of the present disclosure will be described in more detail with reference to FIGS. 5A and 5B together with FIG. 1.

Referring to FIG. 5, when a specific word is selected from input words during performance of an input operation for the words in step 501 which is an input mode, the controller 110 detects the selection of the specific word in step 502. The selection of the specific word can be determined when a specific word is high-lighted through an operation, such as a drag, when a cursor is positioned at or behind the last character of the specific word, or when a cursor is positioned at or before the first character of the specific word.

When the Caps Lock key is entered after the specific word is selected, the controller 110 detects the input of the capital lock key in step 503, and determines whether the first character among characters included in the specific word is a capital letter. When the first character of the specific word is the capital letter, the controller 110 detects that the first character of the specific word is the capital letter in step 504, and changes only the first character of the specific word to a small letter in step 505.

When the Caps Lock key is entered again during a display of the specific word of which the first character is changed to the small letter, the controller 110 detects the input of the Caps Lock key in step 506, and compares the number of capital letters included in the specific word and the number of small letters in step 507.

As a result of the comparison, when the number of capital letters is greater than the number of small letters, the controller 110 detects that the number of capital letters is greater than the number of small letters in step 508, and changes the entire characters of the specific word to the capital letters in step 509.

Further, when the Caps Lock key is entered again during a display of the specific word of which the entire characters are changed to the capital letters, the controller 110 detects the input of the Caps Lock key in step 510, and changes the entire characters of the specific word to the small letters and displays the specific word with the small letters in step 511.

When the Caps Lock key is entered again during a display of the specific word of which the entire characters are changed to the small letters, the controller 110 detects the input of the Caps Lock key in step 512, and changes the first character of the specific word to the capital letter and the remaining characters to the small letters to display the specific word in step 513.

Otherwise, as a result of the comparison, when the number of capital letters is less than the number of small letters, the controller 110 detects that the number of capital letters is less than the number of small letters in step 514, and changes the entire characters of the specific word to the small letters in step 515.

Further, when the Caps Lock key is entered again during a display of the specific word of which the entire characters are changed to the small letters, the controller 110 detects the input of the Caps Lock key in step 516, and changes the entire characters of the specific word to the capital letters and displays the specific word in step 517.

When the Caps Lock key is entered again during a display of the specific word of which the entire characters are changed to the capital letters, the controller 110 detects the input of the Caps Lock key in step 512, and changes the first character of the specific word to the capital letter and the remaining characters to the small letters to display the specific word in step 513.

Further, as a result of the comparison, when the number of capital letters is equal to the number of small letters, the controller 110 detects that the number of capital letters is equal to the number of small letters in step 514, and changes the entire characters of the specific word to the capital letters in step 509.

For example, when "Patent" is selected from words input in the input mode and then the Caps Lock key is entered, "Patent" can be changed to "patent", and when the Caps Lock key is entered again, "patent" can be changed to "PATENT" without comparison because the changed word "patent" consists of only the small letters, when the Caps Lock key is entered again, "PATENT" can be changed to "patent", and when the Caps Lock key is entered again, "patent" can be changed to "Patent".

Otherwise, when "PateNT" is selected from words input in the input mode and then the Caps Lock key is input, "PateNT" can be changed to "pateNT", and when the Caps Lock key is entered again, "pateNT" can be changed to "patent" because the number of small letters is greater than the number of capital letters in changed "pateNT", when the Caps Lock key is entered again, "patent" can be changed to "PATENT", and when the Caps Lock key is entered again, "PATENT" can be changed to "Patent".

Otherwise, when "PATENT" is selected from words input in the input mode and then the Caps Lock key is entered, "PATENT" can be changed to "pATENT", and when the Caps Lock key is entered again, "pATENT" can be changed to "PATENT" because the number of capital letters is greater than the number of small letters in changed "pATENT", when the Caps Lock key is entered again, "PATENT" can be changed to "patent", and when the Caps Lock key is entered again, "patent" can be changed to "Patent".

Figure 6:
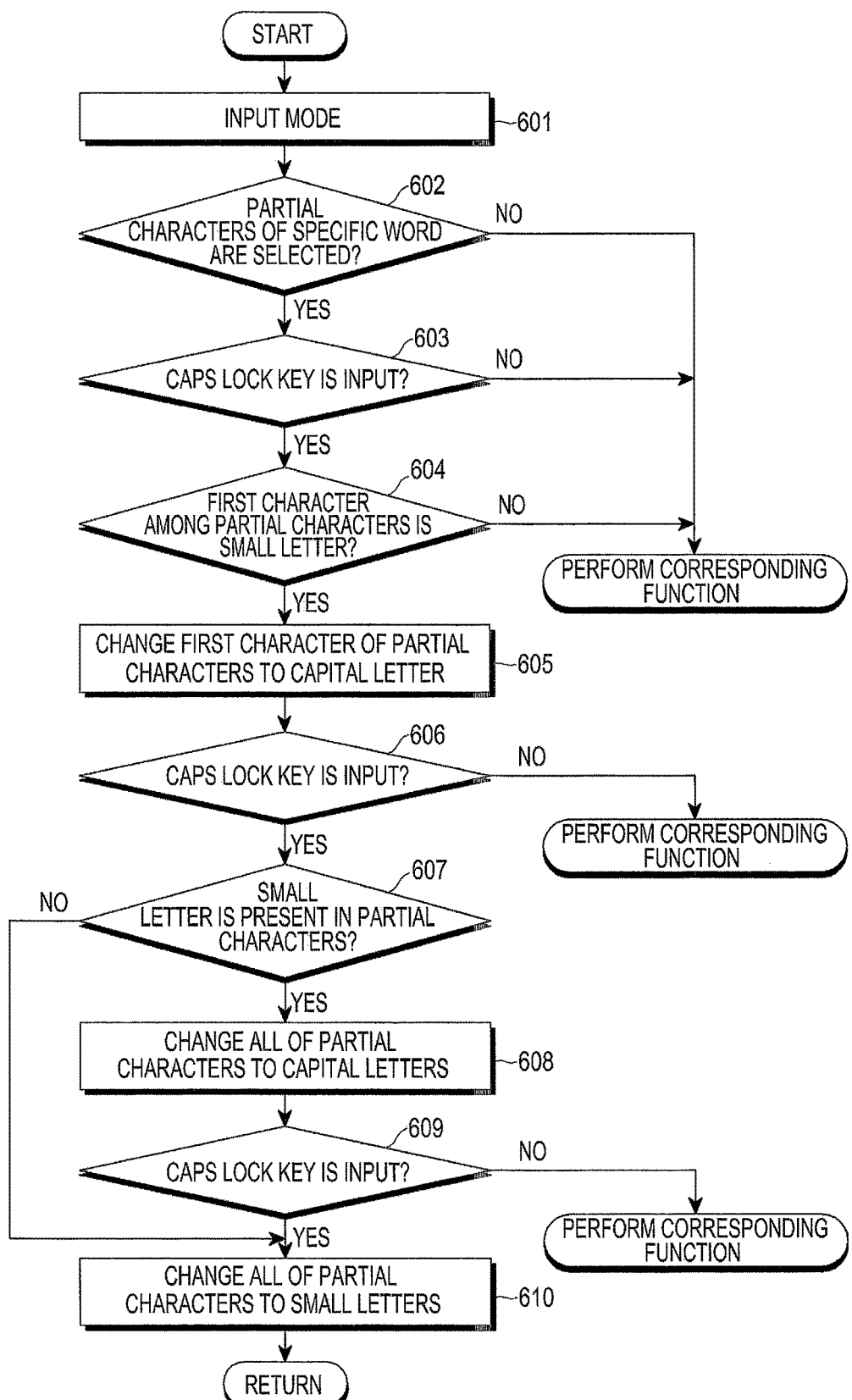
FIG. 6 is a flowchart illustrating a process of converting a character in a terminal according to a fifth embodiment of the present disclosure.

FIG. 6 is a flowchart illustrating a process of changing a character in the terminal according to the fifth embodiment of the present disclosure.

Hereinafter, the embodiment of the present disclosure will be described in more detail with reference to FIG. 6 together with FIG. 1.

Referring to FIG. 6, when partial characters are selected from characters included in a specific word during performance of an input operation for words in step 601 which is an input mode, the controller 110 detects the selection of the partial characters in step 602. The selection of the partial characters of the specific word can be determined when the partial characters of the specific word are high-lighted and displayed through an operation, such as a drag, when a cursor is positioned at or behind the last character of the partial characters of the specific word, or when a cursor is positioned at or before the first character of the partial characters of the specific word. For example, when a cursor is positioned at or behind "a" in "Patent", "Pa" can be selected as the partial characters or "atent" can be selected as the partial characters. The selection of the partial characters of the specific word can be set by a user.

When the Caps Lock key is entered after the partial characters of the specific word are selected, the controller 110 detects the input of the capital lock key in step 604, and determines whether the first character among the partial characters of the specific word is a small letter. When the first character of the partial characters is the small letter, the controller 110 detects that the first character of the partial characters is the small letter in step 604, and changes only the first character among the partial characters to a capital letter in step 605.

When the Caps Lock key is entered again during a display of the specific word of which the first character among the partial characters is changed to the capital letter, the controller 110 detects the input of the Caps Lock key in step 606, and determines whether a small letter is present in the partial characters of which the first character is changed to the capital letter.

When the small letter is present in the partial characters of which the first character is changed to the capital letter, the controller 110 detects that the small letter is present in the partial characters of which the first character is changed to the capital letter in step 607, and changes all of the partial characters to capital letters in step 608.

When the Caps Lock key is entered again during a display of the specific word of which the partial characters are changed to the capital letters, the controller 110 detects the input of the Caps Lock key in step 609, and changes all of the partial characters to the small letters and displays the specific word in step 610.

For example, when "atent" is selected from "Patent" input in the input mode and then the Caps Lock key is entered, "Patent" can be changed to "PAtent", when the Caps Lock key is entered again, "PAtent" can be changed to "PATENT", and when the Caps Lock key is entered again, "PATENT" can be changed to "Patent".

Otherwise, when "aTENT" is selected from words input in the input mode and then the Caps Lock key is entered, "PaTENT" can be changed to "PATENT", and when the Caps Lock key is entered again, "PATENT" can be changed to "patent", and when the Caps Lock key is entered again, "patent" can be changed to "Patent".

Figure 7:
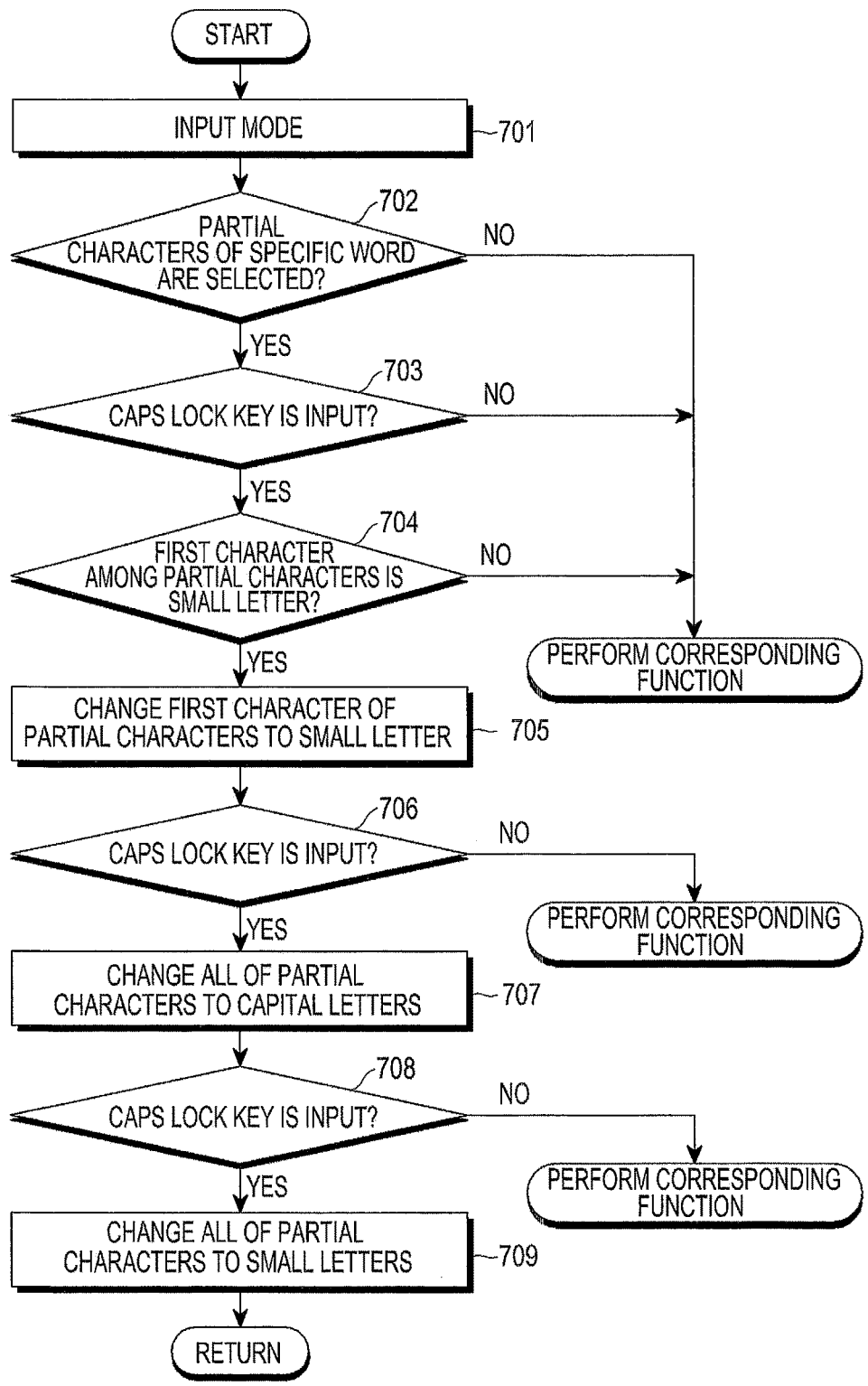
FIG. 7 is a flowchart illustrating a process of converting a character in a terminal according to a sixth embodiment of the present disclosure.

FIG. 7 is a flowchart illustrating a process of changing a character in the terminal according to the sixth embodiment of the present disclosure.

Hereinafter, the embodiment of the present disclosure will be described in more detail with reference to FIG. 7 together with FIG. 1.

Referring to FIG. 7, when partial characters are selected from characters included in a specific word during performance of an input operation for words in step 701 which is an input mode, the controller 110 detects the selection of the partial characters in step 702. The selection of the partial characters of the specific word can be determined when the partial characters of the specific word are high-lighted and displayed through an operation, such as a drag, when a cursor is positioned at or behind the last character of the partial characters of the specific word, or when a cursor is positioned at or before the first character of the partial characters of the specific word. For example, when a cursor is positioned at or behind "a" in "Paten", "Pa" can be selected as the partial characters or "atent" can be selected as the partial characters. The selection of the partial characters of the specific word can be set by a user.

When the Caps Lock key is entered after the partial characters of the specific word are selected, the controller 110 detects the input of the capital lock key in step 703, and determines whether the first character among the partial characters of the specific word is a capital letter. When the first character of the partial characters is the capital letter, the controller 110 detects that the first character of the partial characters is the capital letter in step 704, and changes only the first character among the partial characters to a small letter in step 705.

When the Caps Lock key is entered again during a display of the specific word of which only the first character among the partial characters is changed to the small letter, the controller 110 detects the input of the Caps Lock key in step 706, and changes all of the partial characters to the capital letters in step 707.

When the Caps Lock key is entered again during a display of the specific word of which the partial characters are changed to the capital letters, the controller 110 detects the input of the Caps Lock key in step 708, and changes all of the partial characters to the small letters and displays the specific word in step 709.

For example, when "Atent" is selected from "PAtent" input in the input mode and then the Caps Lock key is entered, "PAtent" can be changed to "Patent", when the Caps Lock key is entered again, "Patent" can be changed to "PATENT", and when the Caps Lock key is entered again, "PATENT" can be changed to "Patent".

Otherwise, when "ATENT" is selected from words input in the input mode and then the Caps Lock key is entered, "PATENT" can be changed to "PaTENT", and when the Caps Lock key is entered again, "PaTENT" can be changed to "pATENT", and when the Caps Lock key is entered again, "pATENT" can be changed to "Patent".

Figure 8:
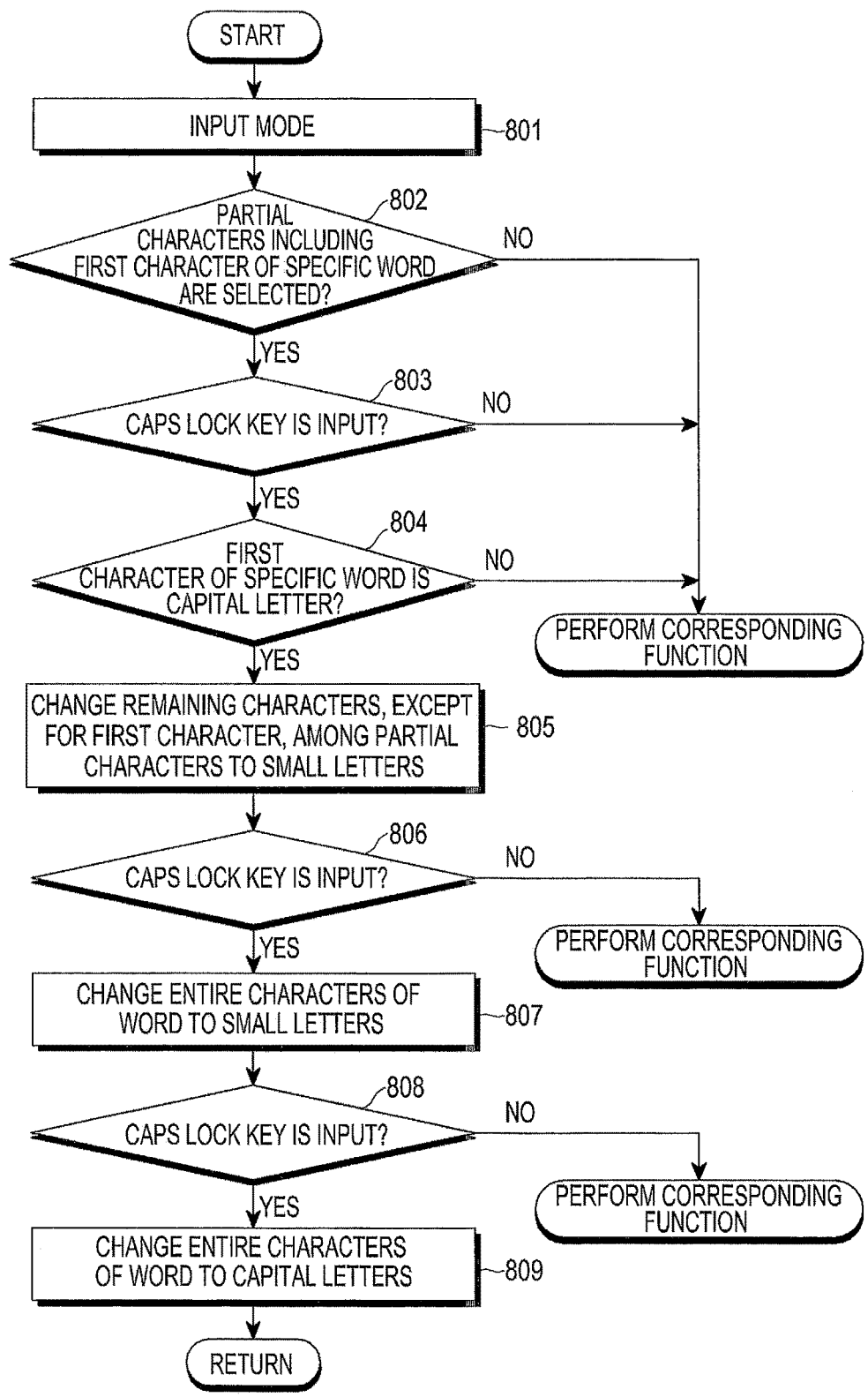
FIG. 8 is a flowchart illustrating a process of converting a character in a terminal according to a seventh embodiment of the present disclosure.

FIG. 8 is a flowchart illustrating a process of changing a character in the terminal according to the seventh embodiment of the present disclosure.

Hereinafter, the embodiment of the present disclosure will be described in more detail with reference to FIG. 8 together with FIG. 1.

Referring to FIG. 8, when partial characters including the first character are selected from characters included in a specific word during performance of an input operation for words in step 801 which is an input mode, the controller 110 detects the selection of the partial characters in step 802. The selection of the partial characters of the specific word can be determined when the partial characters of the specific word are high-lighted and displayed through an operation, such as a drag, when a cursor is positioned at or behind the last character of the partial characters of the specific word, or when a cursor is positioned at or before the first character of the partial characters of the specific word. For example, when a cursor is positioned at or behind "a" in "Paten", "Pa" can be selected as the partial characters or "atent" can be selected as the partial characters. The selection of the partial characters of the specific word can be set by a user.

When the Caps Lock key is entered after the partial characters including the first character in the specific word are selected, the controller 110 detects the input of the capital lock key in step 803, and determines whether the first character of the specific word is a capital letter. When the first character of the partial characters of the specific word is the capital letter, the controller 110 detects that the first character of the partial characters is the capital letter in step 804, and changes the remaining characters, except for the first character, among the partial characters, to the small letters and displays the specific word in step 805.

When the Caps Lock key is entered again during a display of the specific word of which the remaining characters, except for the first character, among the partial characters are changed to the small letter, the controller 110 detects the input of the Caps Lock key in step 806, and changes the entire characters of the specific word to the small letters in step 807.

Further, when the Caps Lock key is entered again during a display of the specific word of which the entire characters of the specific word are changed to the small letters, the controller 110 detects the input of the Caps Lock key in step 808, and changes the entire characters of the specific word to the small letters in step 809.

For example, when "PA" is selected from "PAtent" input in the input mode and then the Caps Lock key is entered, "PAtent" can be changed to "Patent", when the Caps Lock key is entered again, "Patent" can be changed to "patent", and when the Caps Lock key is input again, "patent" can be changed to "PATENT".

In the embodiment of the present disclosure, the process of sequentially changing the characters according to the capital letter and small letter state of the characters included in the specific word or the capital letter and small letter state of the partial characters selected in the specific word has been described as an example, but the process of sequentially changing the characters can be changed by a user.

In the meantime, the apparatus and the method of changing the character in the terminal of the present disclosure can be implemented by computer readable code in a computer readable recording medium. The computer readable recording medium includes every type of recording device in which data readable by a computer system is stored. Examples of the computer readable recording medium include ROM, RAM, optical disks, magnetic tapes, floppy disks, hard disks, and non-volatile memory, and storage media such as carrier waves (e.g., transmission through the Internet). Further, the computer readable recording medium is distributed to computer systems connected through a network, so that a computer readable code can be stored and executed by a distribution method.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. An apparatus, comprising:
an input unit including a plurality of keys; and
a controller configured to:
when a word is selected and then a change key is entered, and a first character of the word is a small letter, change the first character to a capital letter,
when the change key is entered in a state where the first character of the word is a capital letter, compare a number of capital letters of the word to a number of small letters, and when the number of capital letters of the word is greater than the number of small letters, change all characters of the word to capital letters, and
when the number of capital letters of the word is less than the number of small letters, change all characters of the word to small letters.

2. The apparatus of claim 1, wherein the change key is a capital lock key.

3. An apparatus, comprising:
an input unit including a plurality of keys; and
a controller configured to:
when a word is selected and then a change key is entered, and a first character of the word is a capital letter, change the first character to a small letter,
when the change key is entered in a state where the first character of the word is the small letter, compare a number of capital letters of the word to a number of small letters, and
when the number of capital letters of the word is greater than the number of small letters, change all characters of the word to capital letters, and
when the number of capital letters of the word is less than the number of small letters, change all characters of the word to the small letters.

4. The apparatus of claim 3, wherein the controller is further configured to:
when partial characters of the word are selected and then the change key is entered, and the first character among the partial characters is a small letter, change the first character to a capital letter,
when the change key is entered in a state where the first character among the partial characters is a capital letter, change all of the partial characters to capital letters, and
when the change key is input in a state where all of the partial characters are the capital letters, change all of the partial characters to small letters.

5. The apparatus of claim 4, wherein the controller is further configured to:
when the change key is input in a state where the first character of the partial characters is a capital letter, and the partial characters do not include a small letter, change all of the partial characters to small letters.

6. The apparatus of claim 3, wherein the controller is further configured to:
when partial characters of the word are selected and then the change key is entered, and the first character among the partial characters is a capital letter, change the first character to a small letter,
when the change key is input in a state where the first character among the partial characters is a small letter, change all of the partial characters to capital letters, and
when the change key is entered in a state where all of the partial characters are capital letters, change all of the partial characters to small letters.

7. The apparatus of claim 3, wherein the controller is further configured to:
when partial characters including the first character of the word are selected and then the change key is entered, and the first character of the word is a capital letter, change remaining characters, except for the first character, among the partial characters to small letters, and
when the change key is entered in a state where the first character among the partial characters is a capital letter, change the entire characters of the word to small letters.

8. The apparatus of claim 7, wherein the controller is further configured to:
when the change key is entered in a state where entire characters of the word are small letters, change the entire characters of the word to small letters.

9. A method comprising:
when a word is selected and then a change key is entered, and a first character of the word is a small letter, changing the first character to a capital letter;
when the change key is entered in a state where the first character of the word is a capital letter, comparing a number of capital letters of the word and a number of small letters;
as a result of the comparison, when the number of capital letters of the word is greater than the number of small letters, changing all characters of the word to capital letters; and
as a result of the comparison, when the number of capital letters of the word is less than the number of small letters, changing all characters of the word to small letters.

10. The method of claim 9, wherein the change key is a capital lock key.

11. A method comprising:
when a word is selected and then a change key is entered, and a first character of the word is a capital letter, changing the first character to a small letter;
when the change key is entered during a display of the first character of the word with the small letter, comparing a number of capital letters of the word and a number of small letters;
when the number of capital letters of the word is greater than the number of small letters, changing all characters of the word to capital letters; and
when the number of capital letters of the word is less than the number of small letters, changing all characters of the word to small letters.

12. The method of claim 11, further comprising:
when partial characters of the word are selected and then the change key is entered, and the first character among the partial characters is the small letter, changing the first character to the capital letter;
when the change key is entered during a display of the first character among the partial characters with the capital letter, changing all of the partial characters to capital letters; and
when the change key is entered during a display of all of the partial characters of the word with capital letters, changing all of the partial characters to small letters.

13. The method of claim 12, further comprising:
when the change key is entered during a display of the first character among the partial characters with the capital letter, determining whether a small letter is present in the partial characters; and
when the small letter is not present in the word, changing all of the partial characters of the word to small letters.

14. The method of claim 11, further comprising:
when partial characters of the word are selected and then the change key is entered, and the first character among the partial characters is a capital letter, changing the first character to the small letter;
when the change key is entered during a display of the first character among the partial characters with the small letter, changing all of the partial characters to capital letters; and
when the change key is entered during a display of all of the partial characters with the capital letters, changing all of the partial characters to small letters.

15. The method of claim 11, further comprising:
when partial characters including the first character of the word are selected and then the change key is entered, and the first character of the word is the capital letter, changing remaining characters, except for the first character, among the partial characters to small letters; and when the change key is entered during a display of the word of which only the first character among the partial characters is a capital letter, changing all characters of the word to small letters.

16. The method of claim 15, further comprising:

when the change key is entered during a display of all characters of the word with the small letters, changing all characters of the word to small letters.

\* \* \* \* \*